(12) United States Patent
Das Sharma

(10) Patent No.: US 6,922,804 B2
(45) Date of Patent: *Jul. 26, 2005

(54) DYNAMIC END TO END RETRANSMIT APPARATUS AND METHOD

(75) Inventor: Debendra Das Sharma, Santa Clara, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 518 days.

This patent is subject to a terminal disclaimer.

(21) Appl. No.: 10/092,550

(22) Filed: Mar. 8, 2002

(65) Prior Publication Data

US 2003/0172335 A1 Sep. 11, 2003

(51) Int. Cl.$^7$ ................................................ H04L 1/00
(52) U.S. Cl. ...................... 714/746; 714/748; 714/749
(58) Field of Search ............................... 714/746, 748, 714/749, 750, 751, 776, 51, 799; 709/238; 370/245, 349

(56) References Cited

U.S. PATENT DOCUMENTS

2003/0172181 A1 * 9/2003 Sharma ........................ 709/238

FOREIGN PATENT DOCUMENTS

JP          08008995 A  *  1/1996  ........... H04L/29/08

* cited by examiner

Primary Examiner—Albert Decady
Assistant Examiner—Dipakkumar Gandhi

(57) ABSTRACT

A dynamic end to end retry apparatus and method uses the concept of transaction identification numbers combined with a path number and flow control class to uniquely account for all transactions in a multi-processor computer system. The apparatus and method ensure there are no duplicate transactions through the use of special probe and plunge transactions and their respective responses. The apparatus and method also allow for any number of alternate paths being active simultaneously, such that if one path fails, the remaining alternate paths can continue on the communication (along with the backup alternate path if desired) as usual without any loss of transactions.

21 Claims, 12 Drawing Sheets

| VALID | ACK RCVD | TID | DEST | PATH | FCC | 13 |
|---|---|---|---|---|---|---|
| | | | | | | |
| | | | | | | |
| ○ | ○ | ○ | ○ | ○ | ○ | |
| ○ | ○ | ○ | ○ | ○ | ○ | |
| ○ | ○ | ○ | ○ | ○ | ○ | |
| | | | | | | |
| | | | | | | |

FIG. 3A

| VALID | SEND ACK | TID | SOURCE | PATH | FCC | 14 |
|---|---|---|---|---|---|---|
| | | | | | | |
| | | | | | | |
| ○ | ○ | ○ | ○ | ○ | ○ | |
| ○ | ○ | ○ | ○ | ○ | ○ | |
| ○ | ○ | ○ | ○ | ○ | ○ | |
| | | | | | | |
| | | | | | | |

FIG. 3B

DYNAMIC END TO END RETRANSMIT APPARATUS AND METHOD

TECHNICAL FIELD

The technical field is error detection and correction in multiprocessor computer systems.

BACKGROUND

Path or link errors may exist in multiprocessor computer systems. To tolerate such link errors, computer designers have traditionally made use of error correction code (ECC) or retry mechanisms. ECC handles certain permanent errors such as a wire being disconnected in a link (or interconnect) while other links are working. However, if multiple wires in the link are disconnected, or if the entire link is disconnected, the ECC cannot recover the disconnected link. Retry works well for transient errors. If a packet includes errors that can be detected, but not corrected, then the packet will be sent again from a sending node to a receiving node using the same link. The process of sending the packet may repeat several times. However, retry cannot handle errors such as multiple wires failing in a link or the link being disconnected, or an intermediate routing chip being removed for service.

An end to end retry scheme may be used as a means to tolerate link or immediate route chip failures. The basic approach is that each transaction has a time to live, and as a transaction travels through the multiprocessor computer architecture, the value of the time to live is decremented. A transaction that cannot be delivered to its destination node and has its time to live go from its maximum level to zero is discarded. Request transactions may be retried along a secondary path if some predetermined number of attempts along the primary path failed to generate a response. Response transactions may not be acknowledged. If a response transaction does not reach its destination mode, the failure of the response transaction to reach the destination node will have the same effect as the corresponding request transaction not reaching the destination mode, and as a result the request transaction may be retried.

This end-to-end retry scheme has several disadvantages. First, is that the time-out hierarchy is tied to the retry protocol. If a request transaction is tried four times, for example, (along primary and alternate paths) before the request reaches an error time out, then the next transaction type in the hierarchy has to wait for four times the time out for every lower level transaction, the transaction type can generate. For example, a memory read request may cause several recalls. Thus, the memory read request may be reissued only after allowing all recalls to happen. Thus, the memory read request's reissue time out is the maximum number of recalls times the four times the recall time out, plus the times of flight for the request transaction and the response transaction. As a result, the time out hierarchy keeps increasing exponentially (that is the factor four keeps getting multiplied across the hierarchy).

A second disadvantage is that verifying a time out hierarchy is a challenging design requirement since time outs frequently take place over the period of time measured in seconds, and simulating a large system to the range of seconds of operation is almost impossible. A third disadvantage is that the retry strategy requires participation of all chips in the interconnect (at least to decrement the time out value). Thus, the retry strategy does not work well in a computer architecture that has components, such as a crossbar, that the computer designer is trying to leverage. A fourth disadvantage is that the retry strategy operates in an unordered network, and ordered transactions such as processor input/outputs (PIOs) need an explicit series of sequence numbers to guarantee ordering. In addition, for transactions such as PIO reads that have side effects, a read return cache is needed to ensure the same PIO read is not forwarded to a PCI bus multiple times.

SUMMARY

A dynamic end to end retry apparatus and method uses the concept of transaction identification numbers combined with a path number and flow control class to uniquely account for all transactions in a multi-processor computer system. The apparatus and method ensure there are no duplicate transactions through the use of special probe and plunge transactions and their respective responses. The apparatus and method also allow for any number of alternate paths being active simultaneously, such that if one path fails, the remaining alternate paths can continue on the communication (along with the backup alternate path if desired) as usual without any loss of transactions.

In the multiprocessor computer system with multiple nodes, each node keeps track of transactions the node has sent over time to every other node, as well as every transaction the node has received from every other node along each active path for each flow control class. To accomplish this tracking function, two data structures exist. A send_TID, representing the transaction identification (TID) for the last transaction sent by the sending (or source) node to a given destination node exists along any given active path, and a flow control class. A second structure is a receive_TID, representing the TID of the last transaction that a destination node received and for which the destination node sent an acknowledgement (ACK) back to the source node, for each node, along every active path, and for each flow control class. The send_TID and the receive_TID may be stored in send_TID and receive_TID tables at each node in the multiprocessor computer system.

Each node (destination node for the send_TID or source node for the receive_TID) can receive transactions over multiple paths. All nodes in one flow control class may operate over the same number of paths. For example, the system may have four alternate active paths between any two CPU/memory nodes, but only one active path to or from an I/O hub chip. The system does not require distinct physical paths between any source-destination nodes. For example, the system may comprise four active paths with two active paths sharing a physical path.

Every transaction that is sent from a source node to a destination node is also put into a retransmit buffer. When the transaction results in an acknowledgement from the destination node, the transaction is removed from the retransmit buffer. The acknowledgement can be piggybacked with an incoming transaction and/or a special transaction. No acknowledgement is necessary for an acknowledgement transaction. If a transaction is not acknowledged within a predetermined time, recovery actions are taken. The destination node may wait to gather several transactions for a given source node before generating an explicit acknowledgement transaction, while trying to ensure that such a delay will not generate any recovery actions at the source node. This delay helps conserve bandwidth by avoiding explicit acknowledgement transactions as much as possible.

When a source node sends a transaction to a destination node, the source node gets the TID number from the send_TID table, checks that no transaction with the source TID number is pending to the same destination node in the same path and the same flow control class, and sends the transaction to the destination node while also sending the transaction to the retransmit buffer. The source node then increments the corresponding TID number in the send_TID table. When the destination node receives the transaction, the destination node queues the transaction in a destination node receive buffer. If the transaction is of a request type, and the destination node can generate a response within a time out period, the destination node sends a response, which acts as in implicit acknowledgement, to the source node. The destination node then checks the receive_TID table to see if the transaction received by the destination node has the correct TID number. If the transaction has the correct TID number, the destination node updates the corresponding entry in the receive_TID table, and sets a flag bit indicating that the destination node needs to send an acknowledgement transaction. If the transaction does not have a correct TID, the transaction is dropped, since an incorrect TID means that earlier transactions have been dropped in the system. If the destination node cannot generate a response (or the transaction is a response transaction) the destination node simply sends an acknowledgement transaction within the timeout period to the source node. In either case, the destination node resets the flag bit in the receive_TID table indicating that the acknowledgement (or response) has been sent. The destination node sends acknowledgement transactions for transactions received from a particular node, path and flow control class, in order.

If a source node does not receive an acknowledgement transaction within a predetermined time, the source node sends a probe request transaction along an alternate path (preferably an alternate physical path). The probe request transaction contains the source node identification, the path number, the flow control class, the TID of the timed-out transaction, and the TID of the last transaction that is pending. The destination node takes the information contained in the probe request transaction and determines if the destination node has already responded to the timed-out transaction. If the destination node has already responded to the timed-out transaction, the destination node indicates so in a probe request response along with the TID of the last transaction that the destination node has received. This probe request response is sent along an alternate path. The probe request transaction, as well as the corresponding probe request response, may then be used for acknowledgement purposes. When the source node receives an acknowledgement to the probe request transaction, the source node resumes retransmission starting with the transaction after the last TID received by the destination node, if any. From this point on, neither the source node nor the destination node use the path where the problem occurred to receive a transaction or to send out an acknowledgement.

DESCRIPTION OF THE DRAWINGS

The detailed description will refer to the following figures, in which like numbers refer to like elements, and in which:

FIGS. 3A and 3B illustrates a data structures used with the apparatus of FIG. 1;

DETAILED DESCRIPTION

Figure 1:
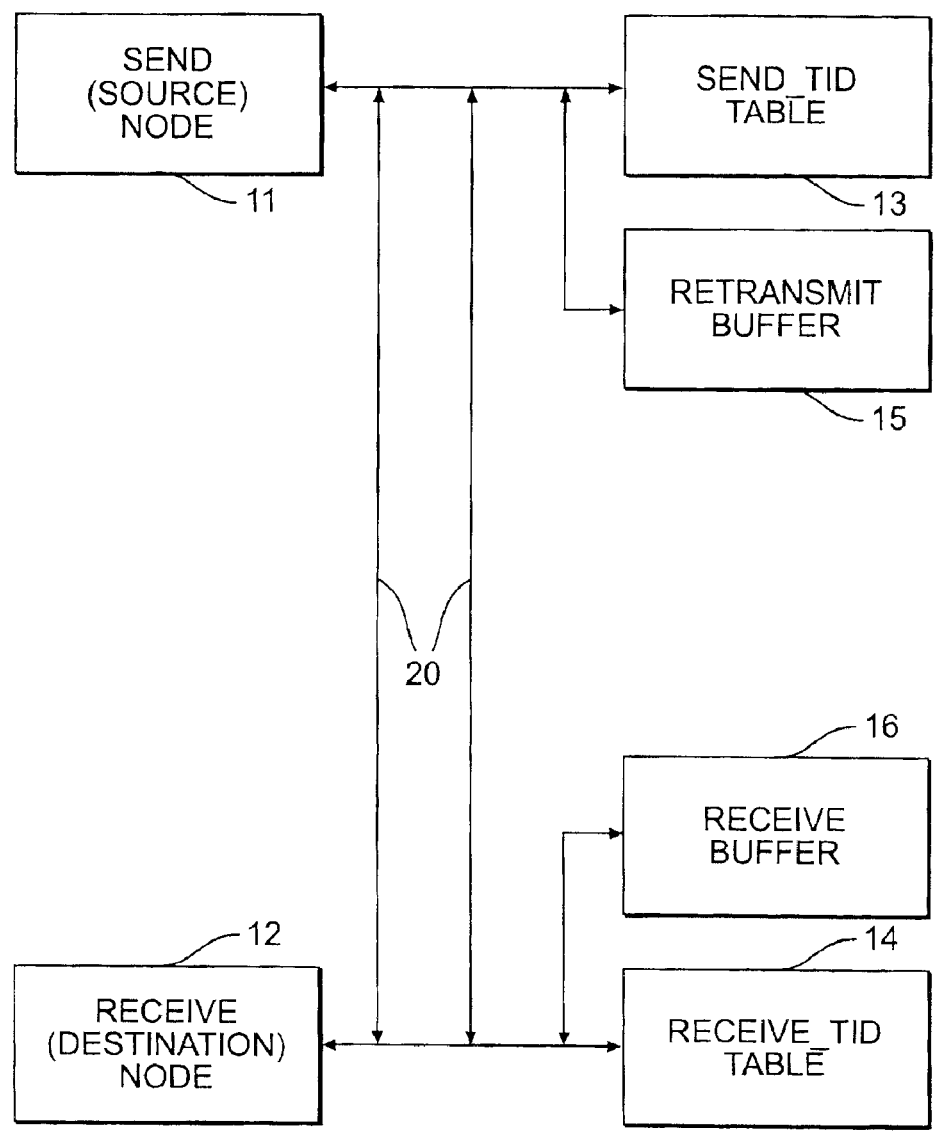
FIG. 1 is a diagram of a multiprocessor computer system that employs a dynamic end to end retransmit apparatus and method.

A dynamic end to end retransmit protocol is implemented by an end to end retransmit apparatus and method employed in a multiprocessor computer system. FIG. 1 is a block diagram of a multiprocessor computer system 10 that employs such an apparatus. In FIG. 1, a send (source) node 11 is coupled to a receive (destination) node 12 through alternate paths 20. The send node 11 is coupled to a send_TID (transaction identification) table 13 and a retransmit buffer 15. The destination node 12 is coupled to a receive_TID table 14 and a receive buffer 16. The designation of the nodes 11 and 12 is arbitrary, and for means of illustration. In the system 10, both the nodes 11 and 12 may send and receive transactions and hence both the nodes 11 and 12 may be any source or destination nodes. The nodes 11 and 12 may be any nodes in the multiprocessor computer system 10, such as CPU or memory nodes or I/O hub chips. The paths 20 may be distinct physical paths or virtual paths. The send node 11 sends transactions to the destination node 12 along one of the paths 20 and receives responses or acknowledgements from the destination node 12 along one of the paths 20. Transmissions sent from the send node 11 to the destination node 12 may be temporarily placed in the retransmit buffer 15. Similarly, responses and acknowledgements from the destination node 12 to the send node 11 may be temporarily placed in the receive buffer 16. The send_TID table 13 and the receive_TID table 14 may be used to store information related to the transactions such as the TID number of each transaction, response or acknowledgement, sending node identification ($N_i$), path identification ($P_i$), flow control class (FCC), and other information.

Figure 2:
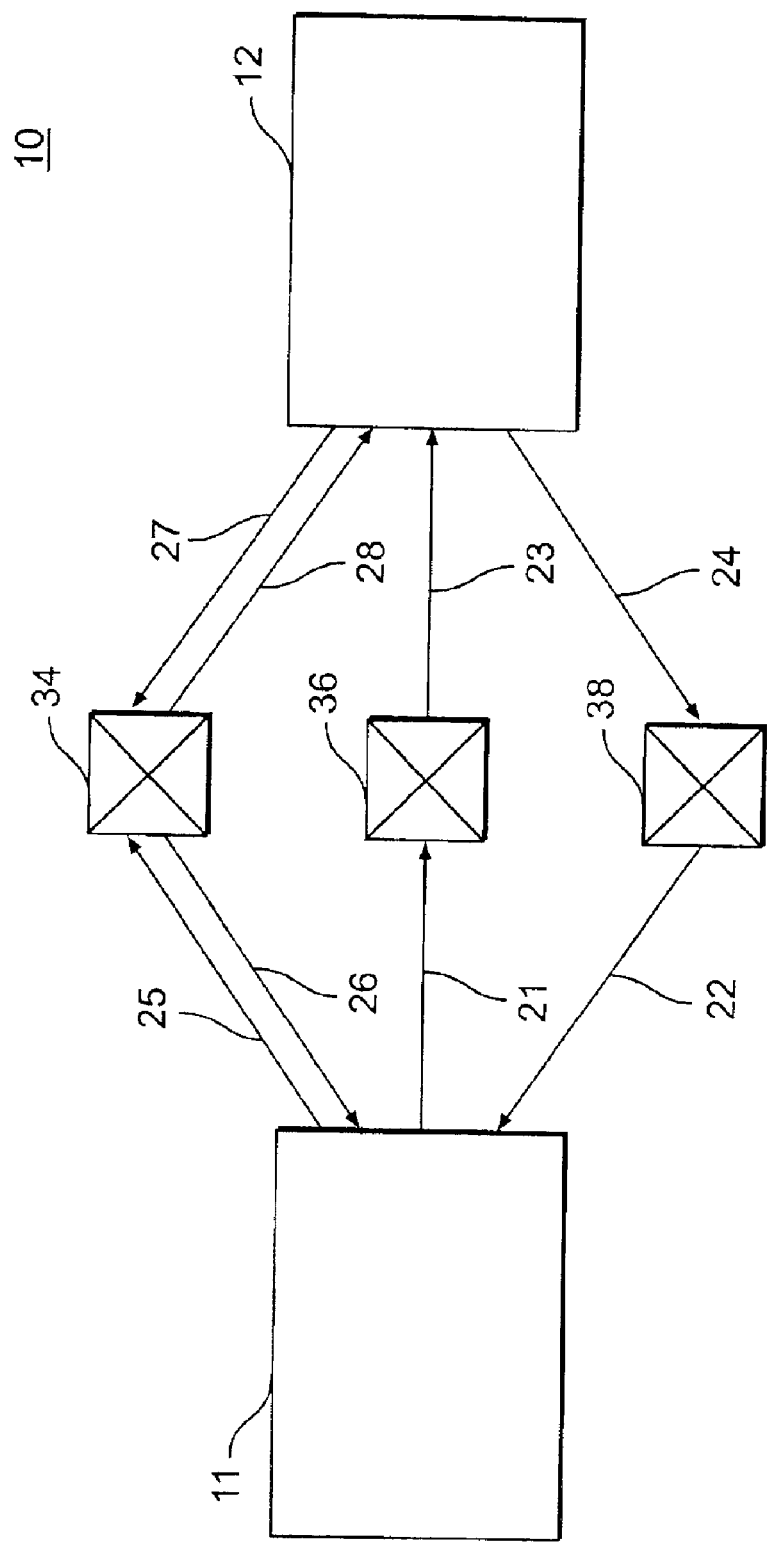
FIG. 2 is a further block diagram of a system of FIG. 1.

FIG. 2 is a block diagram of the microprocessor computer system 10 of FIG. 1 showing additional details of operation of the dynamic end to end retransmit apparatus. The nodes 11 and 12 are connected through a number of cross-bar type routing chips. In the illustrated example, the cross-bar chips 34, 36, and 38 are used to connect the nodes 11 and 12. However, fewer or more cross-bar chips could be used.

The nodes 11 and 12 are connected by two paths, P1 and P2. The path P1 is designated by links 21–24. The path P2 is designated by links 25–28. Any of the links 21–28 in the paths P1 and P2 may fail. For example, the link 28 (in path P2 from the source node 11 to the destination node 12) may fail. Thereafter, any transaction the source node 11 sends (or has sent) to the destination node 12 over the link 28 and the path P2 may not arrive at the destination node 12, and hence may not be acknowledged by the destination node 12. The source node 11 may eventually time out on the oldest non-acknowledged transaction. The source node 11 will thenceforth stop using the path P2 for sending any subsequent normal transactions. In particular, the source node 11 may deconfigure the path P2 and may stop accepting any acknowledgements that are sent to the source node 11 over the path P2. However, the source node 11 may continue to receive normal transactions over the path P2. The source node 11 may also send a probe request to the destination node 12 along the path PI, for example, over the links 21 and 23. The probe request will be described in detail later. The destination node 12 may respond, using the path P1, with the transaction number of the last transaction received by the destination node 12 from the source node 11 over the path P2. The destination node 12 then stops receiving any normal transactions along the path P2. The deconfigured path P2 may be indicated by use of a separate status bit, for example.

The source node 11 may attempt to determine if the failed path P2 is still open. For example, an unacknowledged transaction may have been the result of a transient error, in which case the path P2 may still be available for sending and receiving transactions, including acknowledgements. After receiving the response to the probe request, the source node 11 may send a plunge request along the failed path P2 and flow control class to the destination node 12. The plunge request will be described in detail later. The plunge request indicates the TID of the first transaction the source node 11 will retransmit if the path P2 is re-established. On receiving the plunge request, the destination node 12 may re-establish the path P2. The destination node 12 then initiates a response for the plunge request. Since the plunge request itself may be in the response flow control class, the destination node 12 may use a flag bit in the receive_TID table 14 to send the plunge request response when space exists in the receive buffer 16. Once the source node 11 receives the response to the plunge request, the source node 11 can start using the path P2 for normal transactions. If the source node 11 does not receive a response to the plunge request, the source node 11 does not use the path P2 until maintenance software guarantees that the path P2 has been re-established. In an embodiment, the source node 11 may retry the determination of the existence of the path P2 by periodically sending plunge requests to the destination node 12.

In the multiprocessor computer system 10 shown in FIGS. 1 and 2, each of the nodes 11 and 12 keeps track of transactions the node has sent over time to the other node, as well as every transaction the node has received from the other node, along each active path for each flow control class. To accomplish this tracking function, two data structures exist as shown in FIGS. 3A and 3B. The send_TID table 13 shown in FIG. 3A may contain the transaction identification (TID) for transactions sent by the source node 11 to the destination node 12 along any given active path and for each flow control class. The send_TID table 13 may also include valid bits and acknowledge (ACK) received bits for each such transaction. The receive_TID table 14 shown in FIG. 3B represents the TID of the transactions that the destination node 12 received for each node, along the active path, and for each flow control class. The receive_TID table 14 may also include valid bits and send ACK bits for each transaction. Each node (destination node 12 for send_TID or source node 11 for receive_TID) can operate over multiple paths. All nodes in one flow control class may operate over the same number of paths. For example, the system 10 may have four alternate active paths between any two CPU/memory nodes, but one active path to or from an I/O hub chip. The system 10 does not require distinct physical paths between any source-destination nodes. For example, the system 10 may comprise four active paths with two active paths sharing a physical path.

The flow control class refers to the type of transactions being sent over the paths/links in the system 10. For example, a memory read request may be in flow control class A and a write request in flow control class B. A path that is available to one flow control class may not be available to a different flow control class.

Every transaction that is sent from the source node 11 to the destination node 12 is also put into the retransmit buffer 15. When the transaction gets an acknowledgement from the destination node 12, the transaction is removed from the retransmit buffer 15. The acknowledgement can be piggybacked with an incoming transaction and/or a special transaction. No acknowledgement is necessary for an acknowledgement. If a transaction does not get an acknowledgement within a predetermined time, recovery actions may be taken. The destination node 12 may wait to gather several transactions for a given source node 11 before generating an explicit acknowledgement transaction, while trying to ensure that such a delay will not generate any recovery actions at the source node 11. This delay helps conserve bandwidth by avoiding explicit acknowledgement transactions as much as possible.

When the source node 11 sends a transaction to a destination node 12, the source node 11 gets the TID from the send_TID table 13, checks that the transaction is not pending to the same destination node 12, and sends the transaction to the destination node 12 while placing the transaction in the retransmit buffer 15. When the destination node 12 receives the transaction, the destination node 12 queues the transaction in the receive buffer 16. If the transaction is of a request type, and the destination node 12 can generate a response within the time out period, the destination node 12 sends a response to the source node 11, which acts as an implicit acknowledgement. The destination node 12 then checks the receive_TID table 14 to see if the transaction the destination node 12 received is not in default. If the transaction has the correct TID, the destination node 12 adds an entry in the receive_TID table 14, and sets the ACK bit to 1 indicating that the destination node 12 needs to send an acknowledgement transaction. If the transaction does not have a valid TID, the transaction is dropped.

If the source node 11 does not receive an acknowledgement transaction within a predetermined time, the source node 11 sends a probe request transaction along an alternate path. The probe request transaction contains the source node identification, the path number, the flow control class, and the TID of the timed-out transaction, and the TID of the last transaction that is pending in the retransmit buffer 15. The destination node 12 takes the information contained in the probe request transaction and determines if the destination node 12 has already responded to the timed-out transaction. If the destination node 12 has already responded to the timed-out transaction, the destination node 12 indicates so in a probe request response along with the TID of the last transaction which the destination node 12 has received. The probe request response is sent along an alternate path. The probe request transaction, as well as the corresponding probe request response, may then be used for acknowledgement purposes. When the source node receives an acknowledgement to the probe request transaction, the source node resumes retransmission starting with the transaction after the last TID received by the destination node 12, if any. From this point on, neither the source node 12 nor the destination node 12 use the path where the problem occurred to receive a transaction or to send an acknowledgement.

Figure 4A:
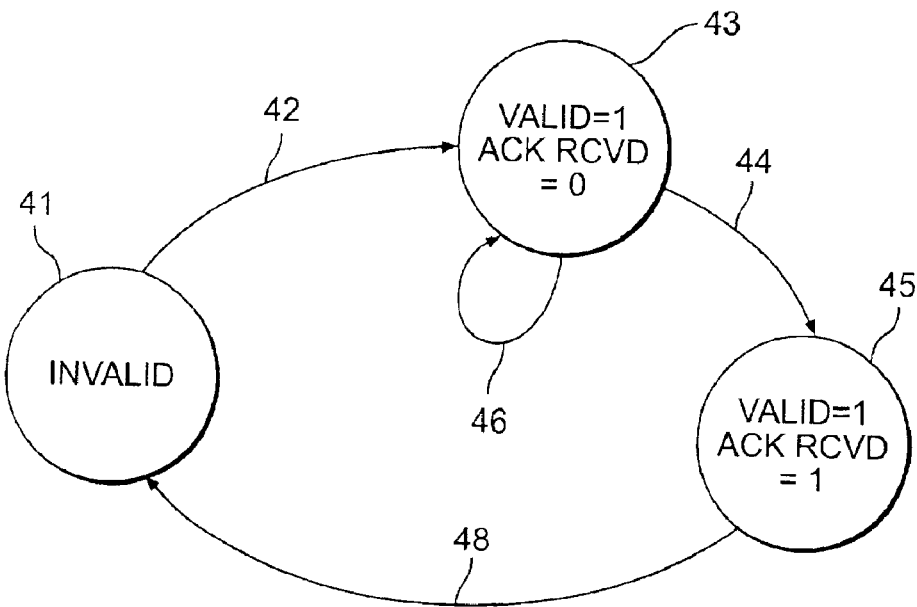
FIGS. 4A and 4B illustrate state diagrams for send and receive nodes of the system of FIG. 1.
Figure 4B:
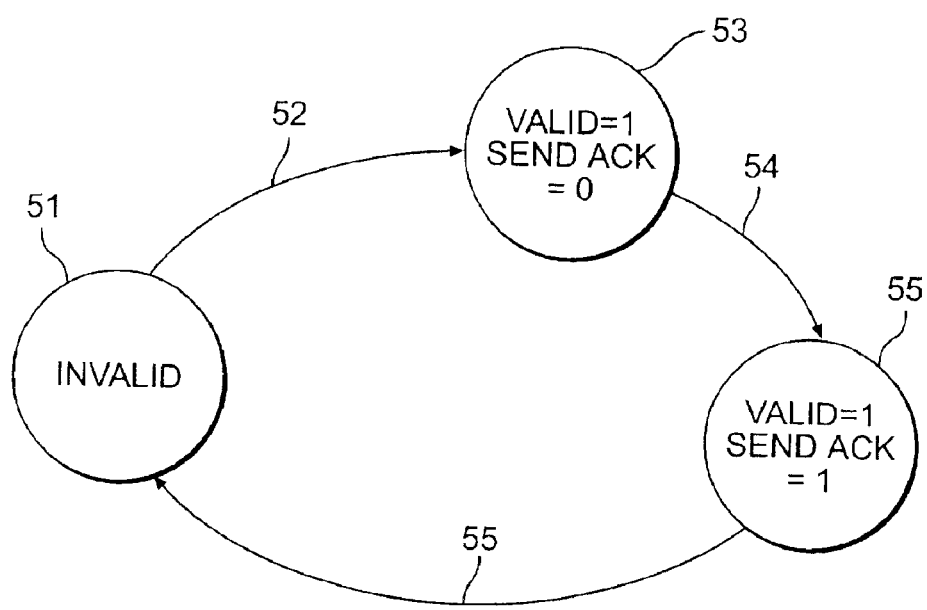

FIGS. 4A and 4B illustrate state diagrams for the source node 11 and the destination node 12, respectively. Transactions may be sent from the source node 11 to the destination node 12. The destination node 12 may send a response or an acknowledgement (ACK) back to the source node 11. The source node 11 and the destination node 12 track all transactions, and for each transaction, the source node 11 and the destination node 12 determine if the transaction is valid or invalid. When a transaction is determined to be invalid, either the source node 11 or the destination node 12, or both, may initiate some type of recovery action. A valid transaction may be considered any transaction for which a response or ACK has been received within a specified time limit. The time limit may be set based on an expected "time-of-flight," which basically relates to the time expected for a transaction to travel from one node to another node. A typical time limit may be set at four times the "time-of-flight." The source node 11 and the destination node 12, using the send_TID table 13 and the receive_TID table 14, respectively, indicate when a transaction (as an entry in the table) is valid by setting a valid bit for the entry to 1, and indicate when an acknowledgement (ACK) or response has been sent by setting a sent ACK bit to 1, or received by setting an ACK received bit to 1.

In FIG. 4A, a transaction T is sent (transition 42) by the source node 11 to the destination node 12, and the source node 11 makes an entry in the send_TID table 13. Because the transaction T is presumptively valid, but an ACK cannot be immediately received from the destination node 12, the source node 11 sets the valid bit to 1 and the ACK received bit to 0, state 43. The source node 11 may then receive an ACK (or a response) from the destination node 12 (transition 44), and the state machine moves to state 45, where the valid bit remains set to 1 and the ACK (response) received bit is set at 1. However, when in state 43, the destination node 12 may not be able to receive a transaction because the receive buffer 16 may be full. In this case, the destination node 12 may signal a retry to the source node 11, and the source node 11 may indicate receipt of the retry, transition 46. Following state 45, the state machine can only transition back to the invalid state, transition 48, which may occur at a set time, typically about four time the expected time of flight of the transaction from the source node 11 to the destination node 12. This is done to prevent a corner-case scenario in which the source node 11 refuses a TID that was acknowledged to send a transaction, which gets lost. When the source node 11 queries the destination node 12, the source node 11 still has the same TID, but for an older transaction, in its receive_TID table. The source node 11 will indicate that the source node 11 received the transaction response to the probe request. By waiting, the destination node 12 is essentially guaranteed to have removed that TID from the receive buffer 16.

In FIG. 4B, the state machine begins in state 51 with an invalid entry in the receive buffer 16 of the destination node 12. The state machine transitions 52 to the state 53 upon receipt of the transaction T from the source node 11. The valid bit for the corresponding entry in the receive_ID table 14 is set to 1, and the send ACK bit is set to 0. The state machine then transitions 54 to the state 55, when the destination node 12 sends an ACK to the source node 11, and the entry in the receive_ID table 14 is updated with the send ACK bit set to 1. After an appropriate wait time, the state machine transitions 55 back to the invalid state 51. The wait time allows the probe to arrive at the destination node 12 in case the ACK is lost.

Figure 5:
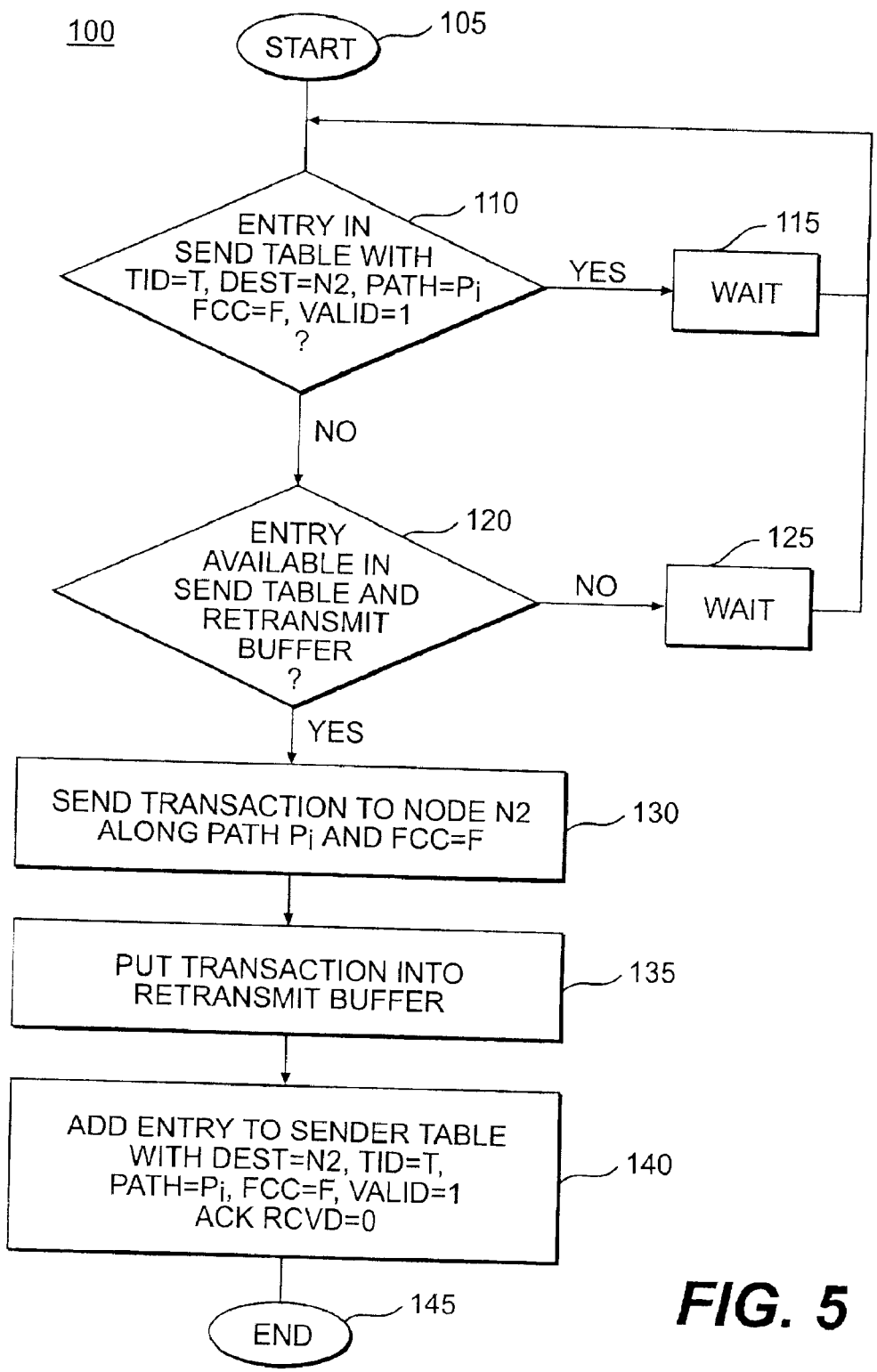
FIGS. 5–11 are flowcharts of operations of the apparatus of FIG. 1.

FIGS. 5–11 are flowcharts illustrating operations of the multiprocess computer system 10 shown in FIG. 1 and the dynamic end-to-end retransmit apparatus operating on the computer system 10. In FIG. 5, an operation 100 is illustrated showing a transaction from the source node to the destination node along path $P_i$ in flow control class F. The operation 100 starts in block 105. In block 110, a check is made to determine if there is an entry in the send_TID table 13 with TID equal to T, destination node equal to N2, path equal to $P_i$, flow control class equal to F, and a valid bit set to 1. In block 110, if such an entry exists, the operation 100 moves to block 115 and either waits, or tries another path P2 for the transaction. The operation 100 then returns to block 110. In block 110, if there is no entry in the send_TID table 13, the operation 100 moves to block 120 and a check is made to determine if an entry (i.e., space) is available in the send_TID table 13 and the retransmit buffer 15. If an entry is not available as checked in block 120, the operation 100 moves to block 125 and waits for a predetermined time before returning to block 110. If an entry is available, as checked in block 120, the operation 100 moves to block 130 and the source node 11 sends the transaction T to destination node 12 (N2) along path $P_i$ and flow control class F. Next, in block 135, the transaction is placed in the retransmit buffer 13. Then, in block 140, an entry is added to the send_TID table 15 with destination equal to N2, TID equal T, path equal $P_i$, flow control class equal to F, with a valid bit set at 1 and acknowledgement received bit set to 0. The operation 100 then ends, block 145.

Figure 6A:
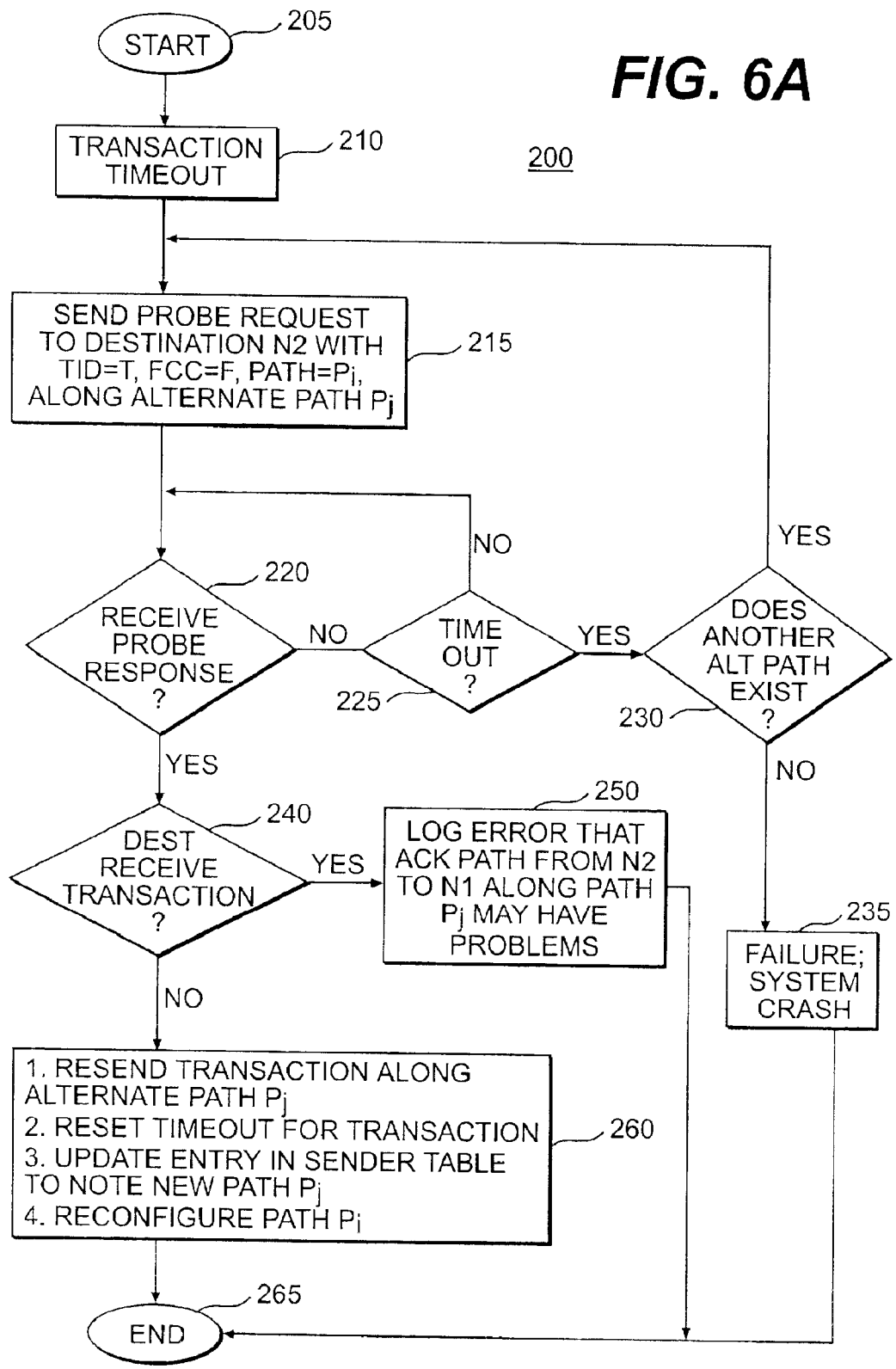

FIG. 6A illustrates an operation 200 in which a transaction in a retransmit buffer times out. Time out typically will occur at either three or four times the maximum time of flight for the given transaction. The operation 200 begins in block 205. In block 210, a transaction T in the retransmit buffer 15 times out. The operation then moves to block 215 and the source node 11 sends a probe request to the destination node 12 with the TID equal to T, the flow control class equal to F, the path equal to $P_i$, along alternative path $P_j$. Next, in block 220, the source node 11 checks to see if a probe response has been received. In block 220, if a probe response has not been received, the operation 200 moves to block 225, and the source node 11 determines if a time out condition has occurred. If the time out condition has not occurred according to the check in block 225, the operation 200 returns to block 220 and the source node 11 continues to wait for reception of a probe response. In block 225, if the time out condition has occurred, the operation 200 moves to block 230 and the source node 11 checks if another alternate path besides the path $P_j$ exists. In block 230, if an alternate path is determined to exist, the operation 200 returns to block 215 and a subsequent probe request is transmitted. In block 230, if another alternate path does not exist, the operation 200 moves to block 235. In block 235, a failure condition is noted and the computer system ID "crashes." The operation 200 then moves the block 265 and ends. In block 220, if the source node 11 receives the probe response prior to a time out of the probe request, the operation 200 moves to block 240. In block 240, the source node 11 determines if the original transaction T was received by the destination node 12. In block 240, if the destination node 12 received the original transaction T, the operation 200 moves to block 250, and an error is logged that an acknowledgement path from the destination node 12 (N2) to the source node 11 (N1) along the path $P_i$ may have a problem. The operation 200 then moves to block 265 and ends. In block 240, if the destination node 12 did not receive the transaction T, the operation 200 moves to block 260 and the source node 11 resends the transaction T along the alternate path $P_j$. The source node 11 then resets the time out for the transaction T, updates an entry in the send_TID table 13 to note the new path $P_j$, and diconfigures the path $P_i$. The operation 200 then moves to block 265 and ends.

Figure 6B:
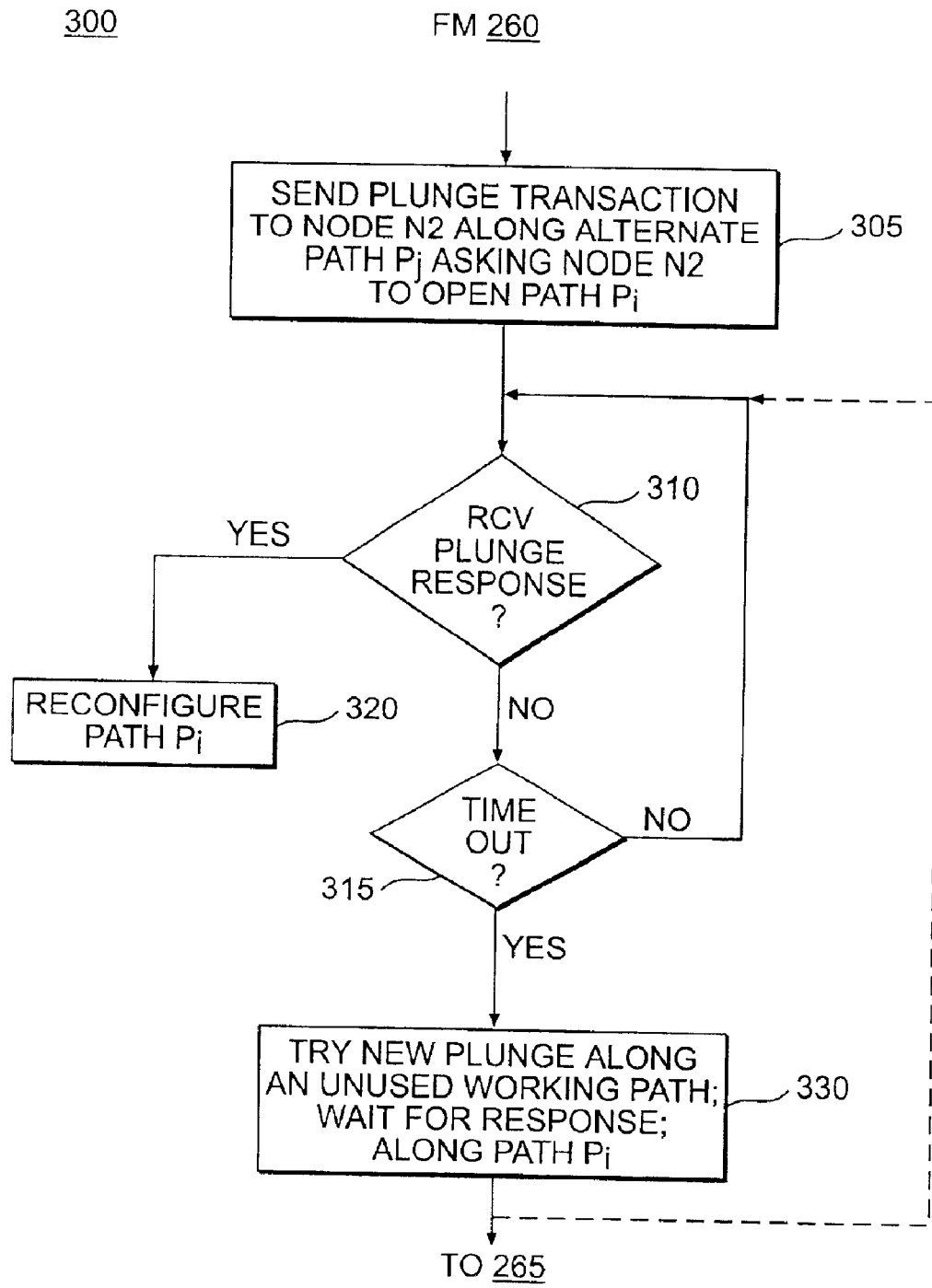

FIG. 6B illustrates an optional operation 300 that may be used if a transaction in a retransmit buffer times out. The operation 300 commences following completion of the function shown in block 260 of FIG. 6A. In block 305, the source node 11 sends a plunge transaction to the destination node 12 along alternate path $P_j$, asking the destination node 12 to open the path $P_i$. In block 310, the source node 11 determines if a plunge response has been received. In block 310, if a plunge response has been received, the operation 300 moves to block 320 and the source node 11 reconfigures the path $P_i$ on. In block 310, if the plunge response has not been received, the source node 11 determines if a time out condition has occurred, block 315. If the time out condition has not occurred, the operation 300 returns to block 310, and the source node 11 continues to wait for reception of a plunge response. In block 315, if a time out condition has occurred, the operation 300 moves to block 330 and the source node 11 tries a new plunge transaction along an unused working path $P_j$ and then waits for a response along the path $P_i$. The operation 300 then returns to block 310. In block 330, if an unused working path $P_j$ is not available, the operation 300 moves to block 265 (FIG. 6A) and ends.

Figure 7:
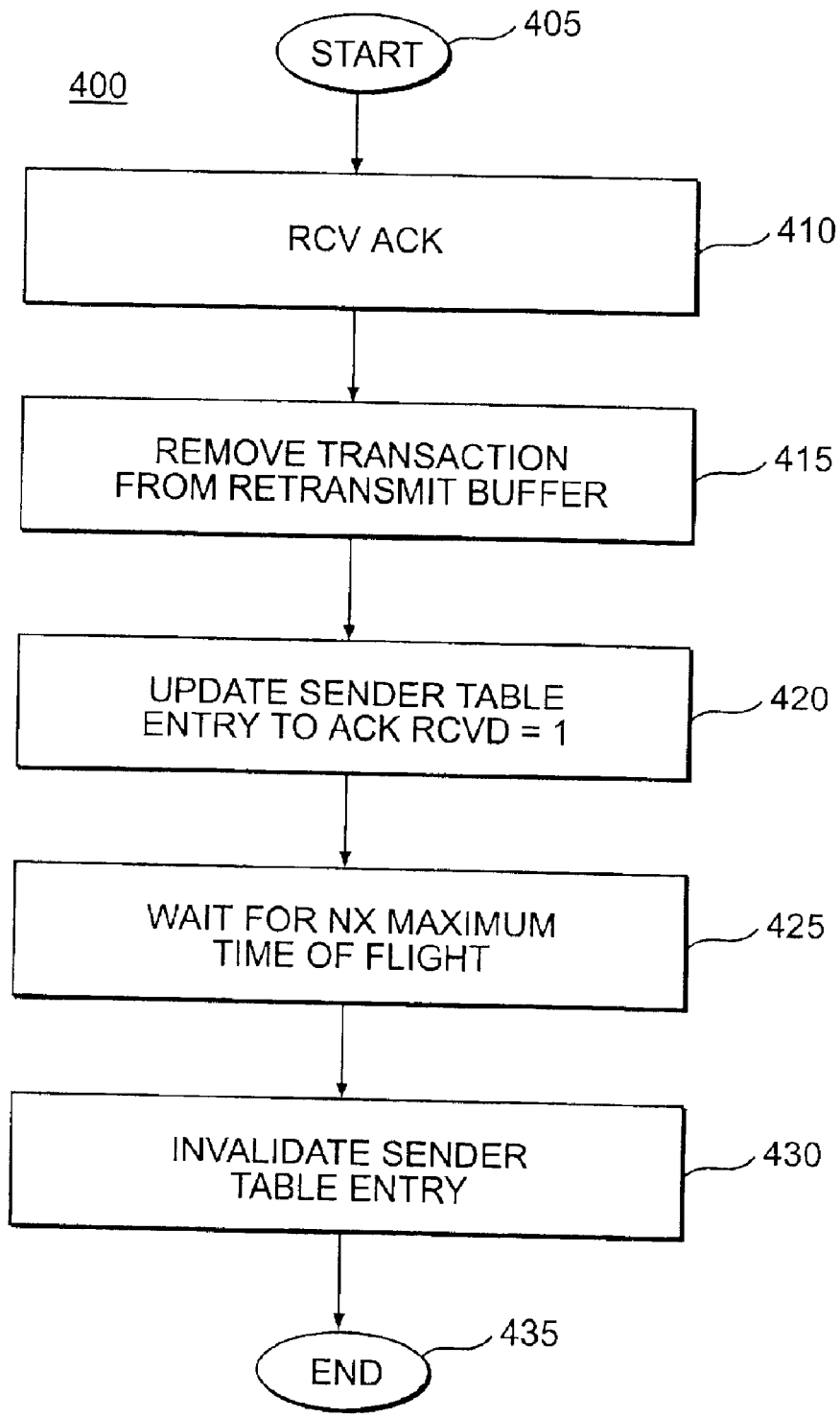

FIG. 7 illustrates an operation 400 in which the source node 11 receives an acknowledgement transaction from the destination node 12. The operation 400 starts in block 405. In block 410, the source node 11 receives the acknowledgement transaction. The operation 400 then moves to block 415 and the source node 11 removes the transaction corresponding to the acknowledgement from the retransmit buffer 15. In block 420, the source node 11 updates the send_TID table entry to acknowledgement received equal 1. In block 425, the source node 11 waits for the N×maximum time of flight. In block 430, the source node 11 invalidates the send_ID table entry. The operation 400 moves to block 435 and ends.

Figure 8:
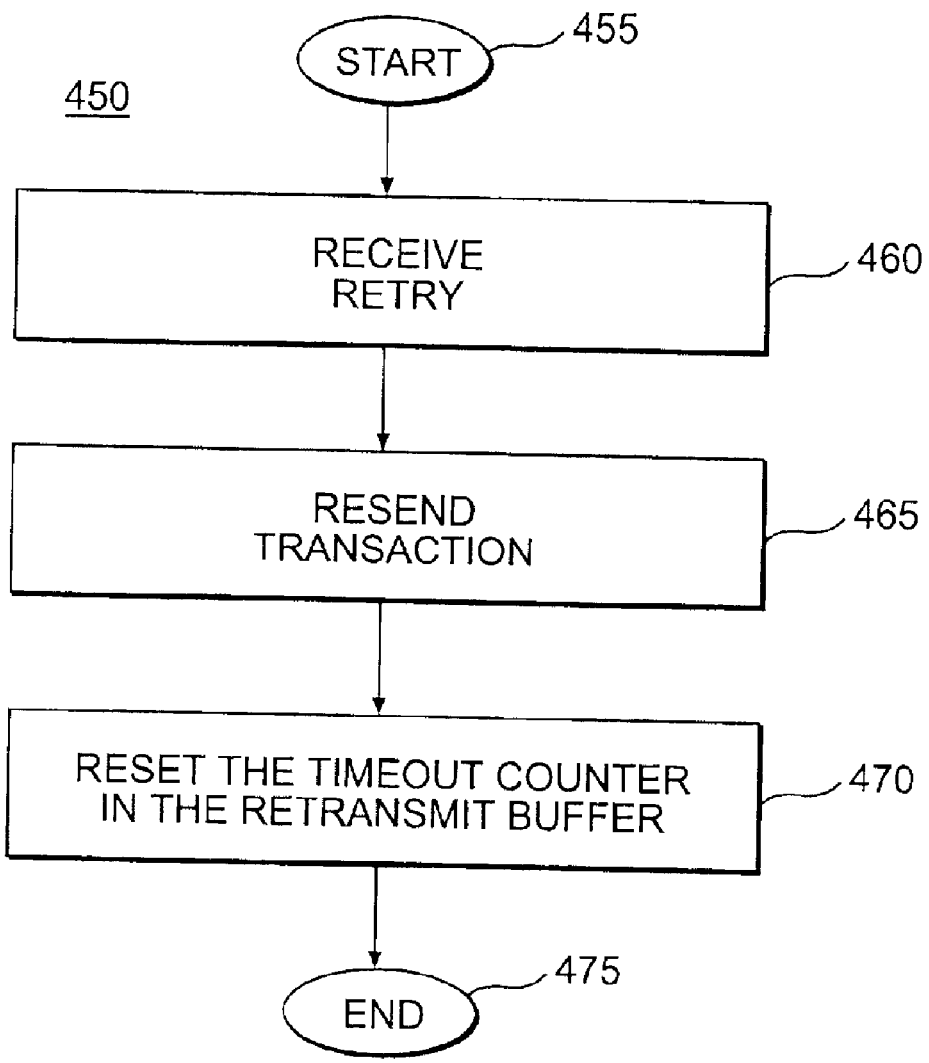

FIG. 8 illustrates an operation 450, in which a node receives a retry transaction. The operation begins in block 455. In block 460, the node receives the retry transaction. The operation 450 then moves to block 465 and the node resends the transaction. In block 470, the node resets the time out counter in the retransmit buffer. The operation then moves to 475 and ends.

Figure 9:
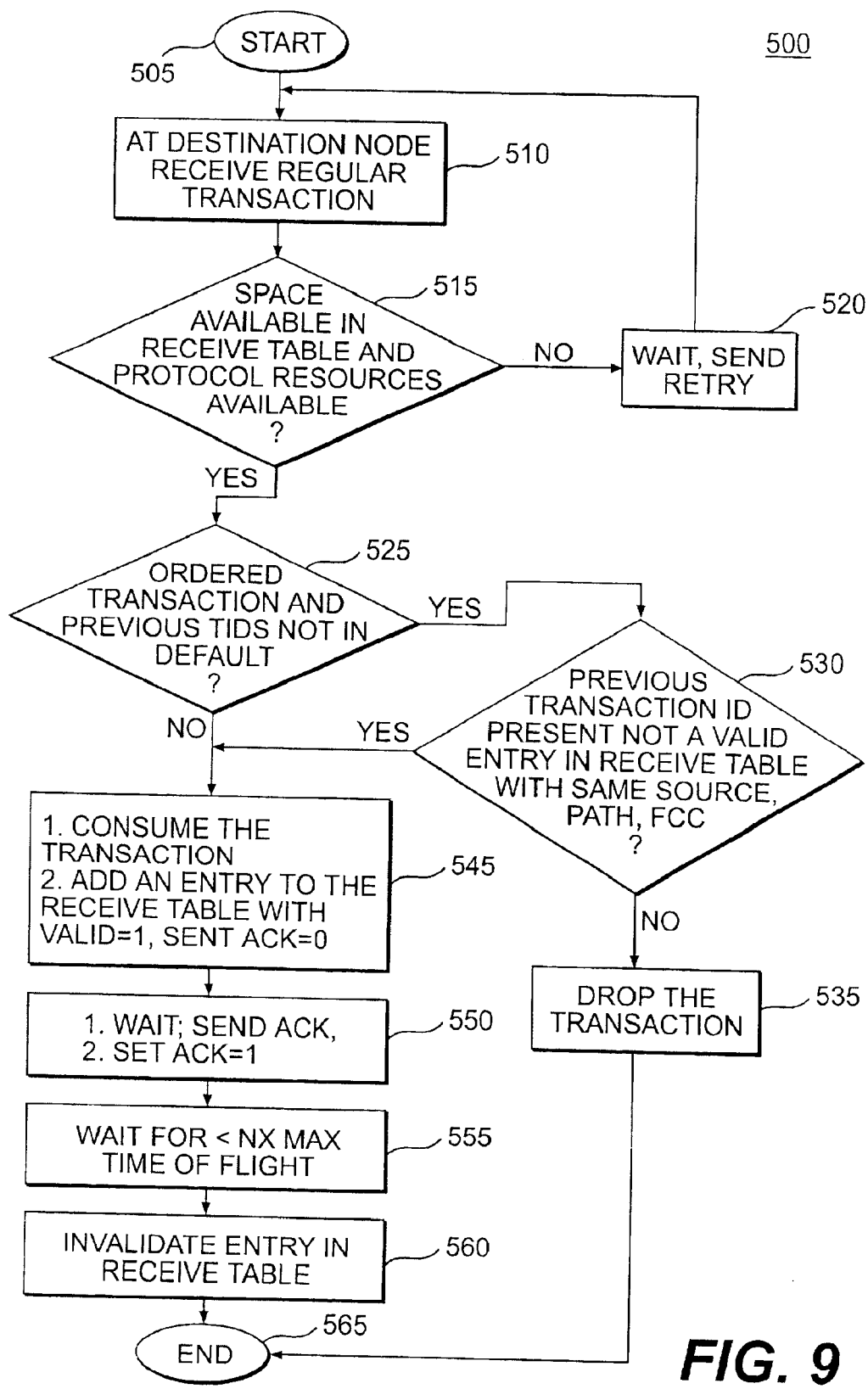

FIG. 9 illustrates an operation 500 in which the destination node, such as the node 12, receives a regular transaction. The operation 500 begins in block 505. In block 510, the destination node 12 receives the regular transaction. The operation 500 then moves to block 513, and the destination node 12 determines if the path $P_i$ is configured. If the path $P_i$ is configured, the operation 500 moves to block 515. Otherwise, the destination node 12 drops the transaction. In block 515, the destination node 12 determines if space is available in the receive_TID table 14 and if protocol resources are available. If space is not available, or the protocol resources are not available, the operation 500 moves to block 520 and the transaction is retried. In block 515, if space is available, the operation 500 moves to block 525 and the destination node 12 determines if ordered transactions and previous TIDs are not in default. If the conditions in block 525 are met, the operation 500 moves to block 530 and the destination node 12 determines if a previous transaction (TID) is present in a valid entry in the receive_TID table 14, for the same source node, path and flow control class. In block 530, if the previous transaction is not present, the operation 500 moves to block 535 and the transaction is dropped. The operation 500 then moves to block 565 and ends. In block 535, if the previous transaction is present in a valid entry, the operation 500 moves to block 545. In block 525, if the ordered transaction is not in default, the operation 500 moves to block 545. In block 545, the destination node 12 consumes the transaction and adds an entry to the receive_TID table 14 with the valid bit set to 1 and the sent acknowledgement bit set to 0. The operation 500 then moves to block 550, the destination node 12 waits, and sends an acknowledgement and sets the acknowledgement bit to 1. In block 555, the destination node waits for time periods slightly less then the N×maximum time of flight. The operation 500 then moves to block 560, and the destination node 12 invalidates the entry in the receive_TID table 14. The operation 500 then moves to block 565 and ends.

Figure 10:
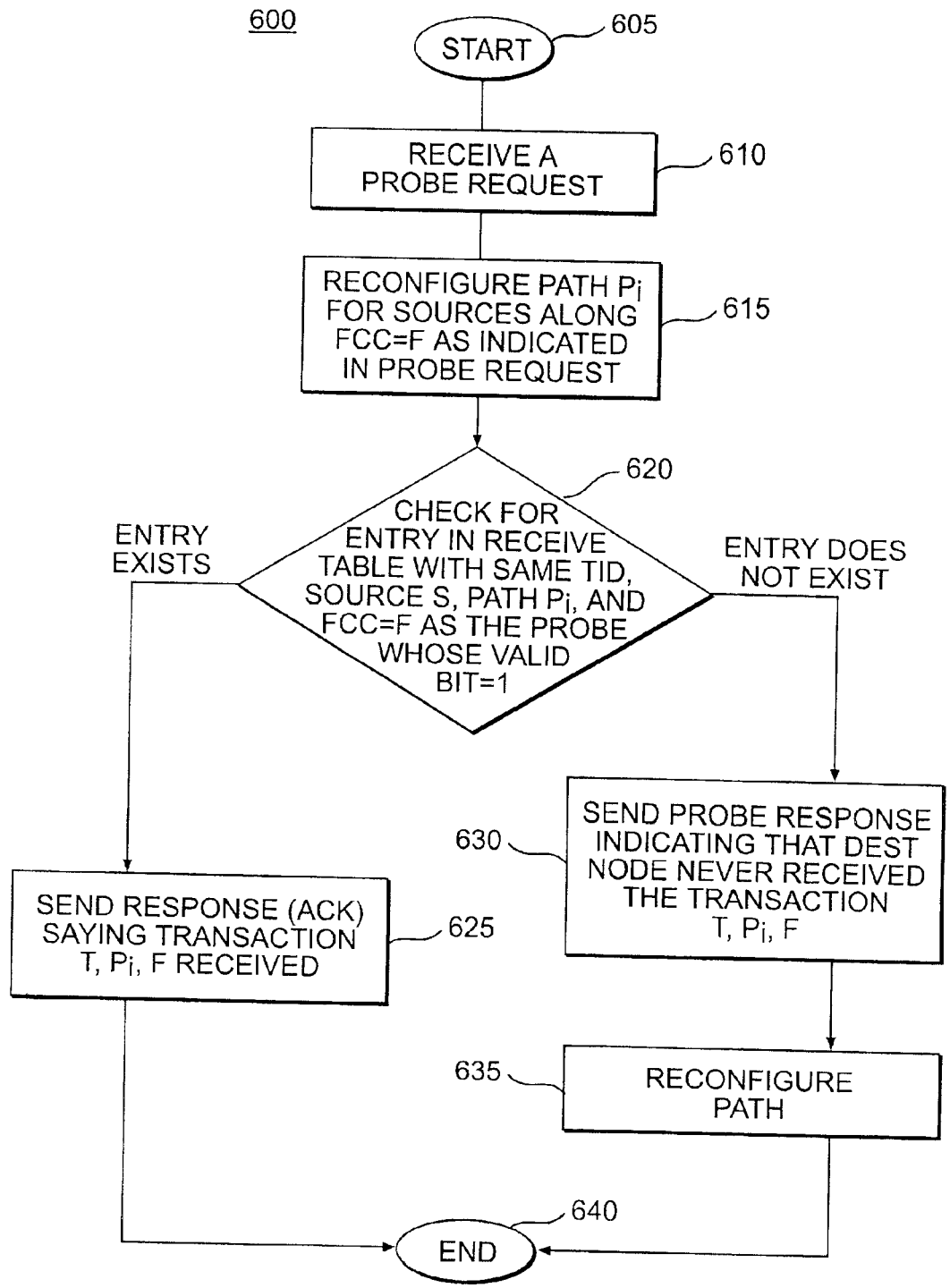

FIG. 10 illustrates an operation 600 in which the destination node 12 has received a probe request. The operation 600 starts in block 605. In block 610, the destination node 12 receives a probe request. In block 615, the destination node 12 deconfigures path $P_i$ for source S along flow control class F as indicated in the probe request. The operation 600 then moves to block 620 and the destination node 12 determines if an entry exists in the receive_TID table 14 with the same TID, source, path and flow control class as in probe request. In block 620, if the entry exists, the operation 600 moves to block 625 and the destination node 12 sends a response, indicating that the transaction with the TID, equal to T, flow control class equal to F, along path $P_i$, was received. The operation 600 then moves to block 640 and ends. In block 620, if the entry does not exist in the receive_TID table 14, the operation 600 moves to block 620, and the destination node 12 sends a probe response indicating that the destination node 12 never received the transaction with TID equal to T, flow control class equal to F, along path $P_i$ from the source S. The operation 600 then moves to block 635, and the destination node 12 deconfigures the path $P_i$. The operation 600 then moves to block 640 and ends.

Figure 11:
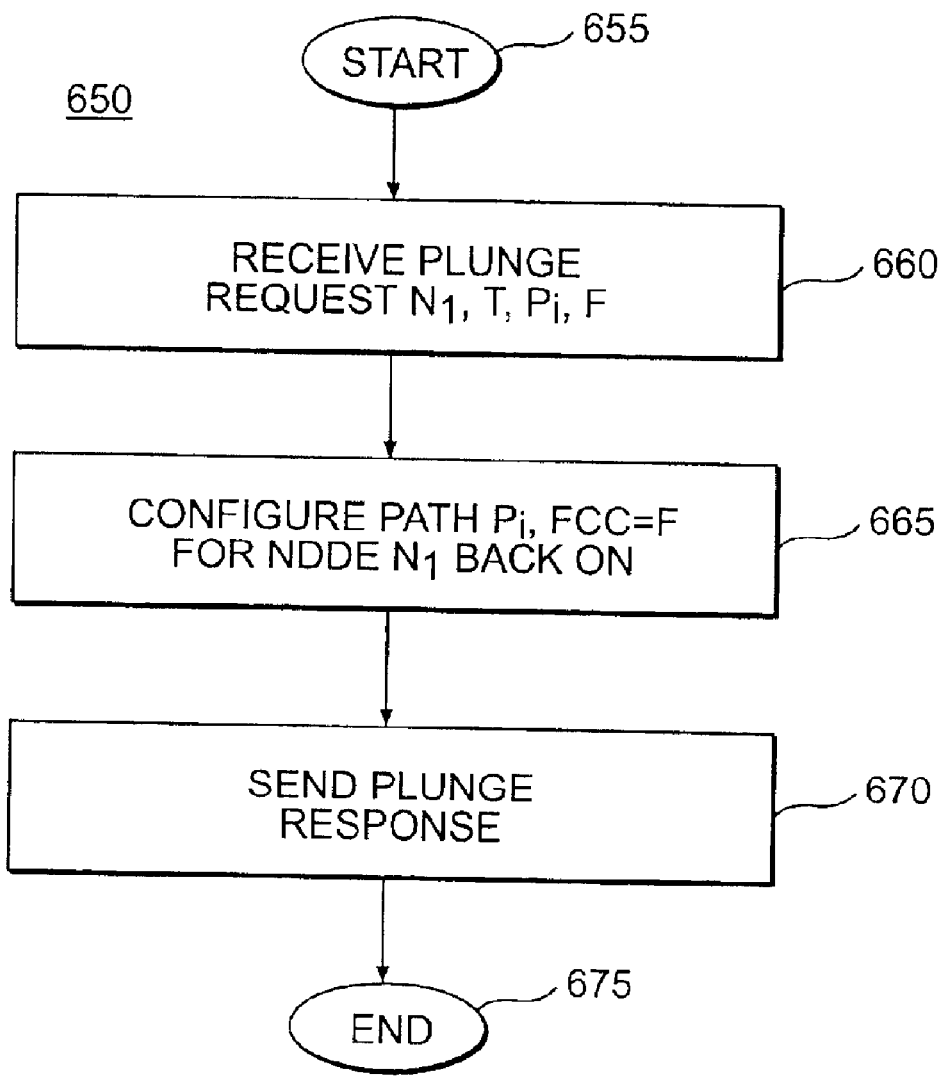

FIG. 11 illustrates an operation 650 in which the destination node 12 receives a plunge request from the source 11 (node N1), along path $P_i$, in flow control class F. The operation 650 begins in block 655. In block 660, the destination node 12 receives the plunge request. In block 665, the destination node 12 configures path $P_i$ in the flow control class F for node N1 (the source node 11) back on. The operation 650 then moves to block 670 and the destination node 12 sends a plunge response to the source node 11. The operation 650 then moves to block 675 and ends.

What is claimed is:

1. A method for dynamic retransmission of transactions in a multi-processor computer architecture, comprising:

at a source node in the computer architecture, the source node comprising a retransmit buffer, designating a transaction for transmission to a destination node in the computer architecture, the destination node comprising a receive buffer, wherein the transaction is designated for transmission over a first path in a first flow control class;

retrieving a transaction identification (TID) for the designated transaction;

comparing the retrieved TID for the designated transaction to TIDs in the transmit buffer, wherein if the comparison does not show a match;

attaching the retrieved TID to the designated transaction, placing the designated transaction in the retransmit buffer, and sending the designated transaction to the destination node; and wherein if the comparison shows a match, transmitting the designated transaction over a second path.

2. The method of claim 1, wherein the designated transaction in the retransmit buffer times out, comprising:

retrieving a TID of a most recent transaction sent to the destination node along the first path;

sending a probe request to the destination node along the second path, the probe request including a TID of the timed-out transaction and the TID of the most recent transaction;

deconfiguring the first path; and updating the TID in the retransmit buffer.

3. The method of claim 2, wherein the destination node receives the probe request, the method at the destination node, comprising:

determining a TID for a most recent transaction entry in the receive buffer for a transaction from the source node along the first path and the first flow control class; and determining:

if the TID for the most recent transaction entry in the receive buffer equals the timed-out transaction TID.

4. The method of claim 3, wherein the TIDs are not equal, further comprising designating an error condition.

5. The method of claim 3, wherein the TID are equal, further comprising:

sending a probe response to the source node along the second path;

indicating to the source node if the timed-out transaction is received at the destination node; and sending the source node the most recent TID acknowledged.

6. The method of claim 5, wherein the source node receives the probe response, comprising resuming transmission for all transactions in the retransmit buffer for which an acknowledgement has not been received.

7. The method of claim 5, further comprising:
    sending a plunge transaction to the destination node over the first path, the plunge transaction indicating a TID for retransmission of transactions should the first path be reconfigured; and
    updating the TID.

8. The method of claim 7, wherein the destination node receives the plunge transaction, the method at the destination node, comprising:
    determining if the first path is deconfigured from the source node; and
    if the first path is deconfigured from the source node, sending a plunge response to the source node over the first path.

9. The method of claim 8, wherein the destination node determines that the first path is not deconfigured, wherein an error condition exists, comprising:
    informing the source node; and
    deconfiguring the first path from the destination node.

10. The method of claim 8, further comprising:
    receiving the plunge responses; and
    reconfiguring the first path from the source node.

11. The method of claim 2, wherein the probe request times out, comprising:
    determining if a third path is available;
    if the third path is available:
        sending a second probe response along the third path, deconfiguring the second path, and
        updating the TID in the retransmit buffer; and
    if the third path is not available, designating an error condition.

12. The method of claim 1, wherein the destination node receives the designated transaction over the first path, the method at the destination node, comprising:
    determining if the first path is configured;
    determining from the receive buffer a TID from a most recent transaction from the source node along the first path in the first flow control class;
    comparing the TIDs of the designated transaction and the most recent transaction to determine if the most recent transaction is in default; and
    if the most recent transaction is not in default, adding an entry to the receive_TID table.

13. The method of claim 12, wherein the most recent transaction is in default, comprising dropping the transaction.

14. The method of claim 13, wherein the first path is configured, comprising:
    accepting the transaction;
    entering the TID of the transaction receive_TID table; and
    sending an acknowledgement to the source node along the first path.

15. The method of claim 14, further comprising:
    waiting for a time period slightly less than N times the time of flight, wherein N equals 3 to 4; and
    invalidating the entry in the receive_TID table.

16. An apparatus for retransmission of transaction in a multi-processor computer architecture, comprising:
    a source node having a retransmit buffer, wherein the source node stores transactions transmitted from the source node;
    a send_TID table comprising a transaction identification (TID) for each transaction sent from the source node;
    a destination node comprising a receive buffer, wherein the destination node stores transactions transmitted from the destination node;
    a receive_TID table comprising a TID for each transaction sent from the destination node, wherein the source node sends normal transactions to the destination node and the destination node sends acknowledgements for the normal transactions to the source node, wherein if the source node does not receive an acknowledgement within a specified time, a corresponding normal transaction in the retransmit buffer times out; and
    a probe transaction, whereby the source node queries the destination node for a timed-out transaction.

17. The apparatus of claim 16, wherein the probe transaction comprises a TID of the timed-out transaction and a TID of a TID of a last transaction pending in the retransmit buffer, wherein the source node comprises:
    means for deconfiguring the first path; and
    means for updating the TID in the receive_TID table.

18. The apparatus of claim 17, wherein the destination node receives the probe transaction, the destination node, further comprising:
    means for determining a TID for a most recent transaction entry in the receive buffer; and
    means for determining if the TID for the most recent transaction entry in the receive buffer equals the timed-out transaction TID.

19. The apparatus of claim 18, wherein if the TIDs are equal, the destination node:
    sends a probe response to the source node along the second path;
    indicates to the source node if the timed-out transaction is received at the destination node; and
    sends the source node the most recent TID acknowledged.

20. The apparatus of claim 19, wherein the source node receives the probe response, wherein the source node comprises means for resuming transmission for all transactions in the retransmit buffer for which an acknowledgement has not been received.

21. The apparatus of claim 18, wherein the TIDs are not equal, further comprising means for designating an error condition.

* * * * *